Oct. 22, 1968   F. PERNA, JR., ET AL   3,406,562
ON-LINE EXHAUST DATA ANALYSIS SYSTEM
Filed Jan. 14, 1966   2 Sheets-Sheet 1

INVENTORS
Frank Perna, Jr. &
Anthony R. Sperling
Thomas N. Young
ATTORNEY

INVENTORS
Frank Perna, Jr. &
Anthony A. Sperling

Thomas N. Young
ATTORNEY 3,406,562
ON-LINE EXHAUST DATA ANALYSIS SYSTEM
Frank Perna, Jr., St. Clair Shores, and Anthony A. Sperling, Warren, Mich., assignors to General Motors Corporation, Detroit, Mich., a corporation of Delaware
Filed Jan. 14, 1966, Ser. No. 520,758
4 Claims. (Cl. 73—23)

ABSTRACT OF THE DISCLOSURE

An exhaust analyzer for use with a vehicle on a test stand. Signals representing various exhaust constituents are produced during sequential periods of various operating modes, weighted in accordance with the character of the mode, e.g., acceleration and deceleration, and averaged over at least one full sequence of operating modes in an analog type computer.

---

This invention relates to a method for analyzing the exhaust of motor vehicles in a special purpose analog-digital computer apparatus for providing substantially immediate results of an exhaust analysis procedure.

Analysis of the constituents of an automotive exhaust, particularly unburned hydrocarbon, carbon dioxide and carbon monoxide, may be accomplished by measuring and recording the quantities of the various constituents present in the exhaust under various controlled conditions such as engine speed, fuel mixture, and so forth. A correlated record of measured constituents and controlled conditions may then be produced along with meaningful data by means of accepted computing techniques. However, such off-line procedure is time consuming and especially impracticable where it is desirable to process a number of vehicles to determine their acceptability under specific standards.

In accordance with the present invention, an automotive vehicle, which is hereinafter taken to mean a vehicle having an internal combustion engine exhausting gases into the air, may be subjected to an exhaust analysis test of specified duration and schedule during which electrical quantities representing exhaust constituents and analysis program parameters are accumulated and processed in accordance with preestablished standards. According to the invention, a complete representation of test results is available substantially upon the completion of the analysis schedule without the need for extensive additional data translation and reduction.

The invention may be best understood by reference to a specific embodiment thereof such as is described in the following specification. This description is to be taken with the accompanying figures of which:

Figure 1:
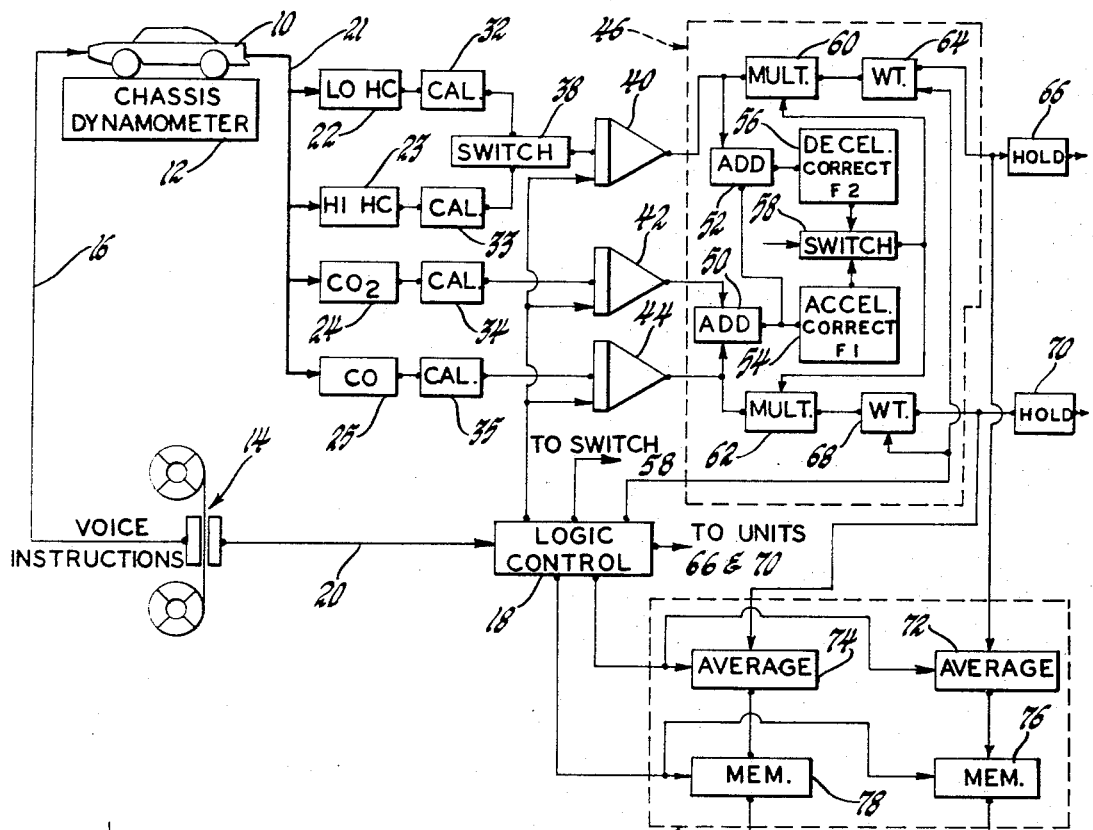
FIGURE 1 is a block diagram of apparatus for carrying out the invention.

The specific embodiment shown in FIGURE 1 is adapted to make an on-line measurement of the quantity of unburned hydrocarbon, carbon dioxide and carbon monoxide in the exhaust of an automobile 10 in accordance with preestablished standards. The automobile 10 is shown mounted on a chassis dynamometer 12 such that the exhaust analysis may be performed in a test cell where actual road conditions are simulated. In FIGURE 1 a tape deck shown in simplified form at 14 is adapted to provide control signals both to the automobile 10 by way of path 16 and to a logic control unit 18 by way of path 20. As suggested in FIGURE 1, the output of the tape deck 14 as delivered to the automobile may take the form of prerecorded voice instructions to enable a human operator to vary the operating mode, i.e., engine speed and transmission range, of the automobile 10 in accordance with a preestablished program. Alternatively, suitable transducers may be provided on the automobile to enable the automatic control thereof. Logic control signals supplied to the logic control unit 18 are recorded on one or more separate tracks of the tape so as to be synchronized with the voice instructions presented to the operator of the automobile 10. The exhaust output 21 of the automobile 10 is directed to four infrared exhaust analyzers 22 through 25. The exhaust analyzers are adapted to provide DC voltage outputs of a magnitude corresponding to the sensed amount of the particular constituent to be sensed by that analyzer; for example, analyzer 24 presents a DC voltage corresponding to the amount of carbon dioxide present in the exhaust 21. A suitable analyzer for use in the apparatus of FIGURE 1 is the Beckman L/B Infrared Analyzer Model 15A available from Beckman Instruments, Inc. of Fullerton, Calif. The output voltages of the four analyzers 22 through 25 are presented to four calibration units 32 through 35, respectively, for linearization purposes. The calibration units 32 through 35 may be diode type function generators which are precalibrated to present transfer functions which linearize the output voltages of the associated analyzers. The voltages at the outputs of calibrators 32 and 33 are connected through a switch 38 to a first integrator 40. It is to be noted that two analyzers 22 and 23 are employed to sense the HC constituent because of the large variations in the quantity thereof. Analyzer 22 is thus low range and analyzer 23 is high range. Switch 38 may be manually controlled. Similarly, the outputs of calibrators 34 and 35 are connected to second and third integrators 42 and 44, respectively. The integrated outputs of the integrators 40, 42 and 44 are connected to a weighting and correction unit 46 which functions to process the voltages in accordance with the character and duration. The outputs of the weighting and correcting unit 46 are presented to a memory unit 48 which may be connected to a suitable output transducer such as a strip chart recorder or an automatic typewriter. As shown in FIGURE 1, the logic control unit 18 is also connected to units 46 and 48 for the purpose of synchronizing the operations thereof with the variation in the engine speed and transmission mode of the vehicle 10 as presented by way of the voice instructions.

Figure 2:
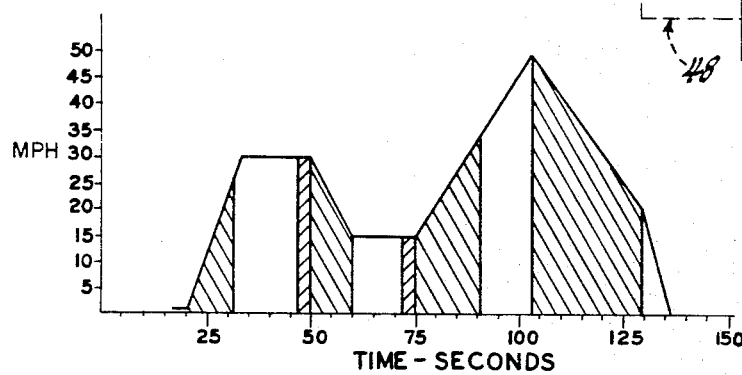
FIGURE 2 is a diagrammatic representation of an engine speed program which has been established as a standard in the State of California for use in exhaust analyses.
Figure 2:
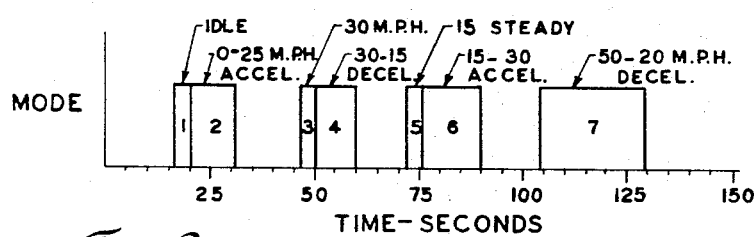

It may be desirable to employ the apparatus of FIGURE 1 in the analysis of exhaust as emitted from an automobile during a test run which simulates a typical automobile trip in a metropolitan area. An example of such a test run is the California Exhaust Schedule a representative portion of which is illustrated in FIGURE 2. This figure shows a speed variation cycle which is repeated seven times in the complete California Exhaust Schedule and includes idle, acceleration, deceleration and steady speed modes. The speed cycle is divided for analysis purposes into various segments which are hereinafter referred to as modes. Accordingly, the apparatus of FIGURE 1 is adapted to receive and process information in the form of electrical signals corresponding to each of the various modes in the speed cycle of FIGURE 2 and to process these signals in accordance with a specific formula which includes correction and weighting factors depending on the character of the modes as given below.

$$\text{Output} = \frac{0.35}{4} \sum_{i=1}^{28} M_i FW_i + \frac{0.65}{2} \sum_{i=36}^{49} M_i FW_i$$

Where:

Output equals percent CO or parts per million HC
$i$ designates mode
$M_i$ = integrated amounts of CO or HC data for the respective mode
$W_i$ = established weighting factors for each mode
F = correction factor It will be noted from the above formula that the apparatus of FIGURE 1 is required to receive data corresponding to the quantity of the measured exhaust constituent for each of the various modes of the speed cycle to correct the data according to whether received during an acceleration or deceleration mode, to weight the various components according to the preestablished weight value assigned to each mode, to average the accumulated data over early speed cycles known as "warm-up" cycles and later speed cycles which are known as "hot" cycles and to multiply the "warm-up" and "hot" cycle averages by different coefficients. It will, of course, be understood that the speed cycle shown in FIGURE 2 and the formula given above may vary according to either local legislative standards or the desired end result of the analysis procedure and therefore the specific examples are not to be construed as limiting the invention.

Referring specifically to FIGURE 2, mode 1 consists of an engine idle during which time information is accumulated in the integrators 40, 42 and 44 of FIGURE 1 under the control of logic unit 18. Mode 2 consists of an acceleration period while mode 3 consists of a steady 30 m.p.h. period. Mode 4 is a deceleration mode, and so forth through the entire speed cycle of FIGURE 2. It is to be noted that there are seven individual modes representing various phases of actual automobile use and each mode has a different weighting term $W_i$. As previously indicated, this speed cycle may be repeated seven times or as many times as is believed to be necessary or desirable. In the complete California Exhaust Schedule, the first four cycles are considered "warm-up" cycles, the fifth cycle is a purge cycle during which time the input transducer analyzers 22 through 25 purge into the air, and cycles six and seven are considered "hot" cycles. The accumulated data for the warm-up and hot cycles are divided as shown in the formula above and separately weighted in the determination of the final output number.

Referring more specifically to FIGURE 1, the calibrated output signals of the four analyzers 22 through 25, in combination with the associated calibration units 32 through 35 respectively, are fed to the three analog integrators 40, 42 and 44 respectively which operate under the control of the logic control unit 18. As previously indicated, logic control unit 18 is synchronized with the modes carried out by the automobile operator in accordance with the schedule shown in FIGURE 2. The outputs of the integrators 40, 42 and 44 are time averaged signals corresponding to the quantity of the particular constituents $M_i$ sensed during the particular mode. At the end of a particular mode, the data in the form of a time averaged signal from the integrators 40, 42 and 44 is transferred to unit 46. The California test calls for a first correction factor F1 for M signals taken during acceleration modes. Since F1 is a function of CO and $CO_2$ constituents measured, the signals from integrators 42 and 44 are added in an adding unit 50. The test also calls for a correction factor F2 for deceleration mode signals as a function of HC, CO and $CO_2$ constituents measured. Accordingly, the combined output of adder 50 is added to the signal from integrator 40 in an adder 52. The output from adder 50 is thus seen to comprise a signal corresponding to the sum of the $CO_2$+CO content whereas the output of adder 52 is seen to comprise the sum of HC+$CO_2$+CO. To generate the desired correction factors based on the now properly assembled signals, the output of adder 50 is then applied to an acceleration correction unit 54. Similarly the output of adder 52 is applied to a deceleration correction unit 56. The output of either the acceleration correction unit 54 or the deceleration correction unit 56 is then connected through a switch 58 which operates under the control of logic unit 18 according to whether an acceleration or deceleration mode is being processed to supply signals to multipliers 60 and 62. Multiplier 62 serves to multiply the output of integrator 40 by the proper acceleration or deceleration mode correction factor calculated previously whereas multiplier 62 serves to multiply the output of integrator 44 by the proper correction factor previously calculated.

The output of multiplier 60 is transferred through a weighting unit 64 which operates under the control of logic unit 18 to supply the weighting factor $W_i$ to the combination $M_iF$ in the above formula. The final calculated value for the registered mode is then applied to a holding unit 66. The output of multiplier 62 is similarly connected through a weighting unit 68 to a holding unit 70. Hold units 66 and 70 may be connected to a suitable output transducer such as a strip chart recorder or a typewriter for recording of the various mode values as they occur according to the FIGURE 2 schedule.

It is necessary in accordance with the formula given above to average the data which is accumulated during the speed cycles, each of which in turn contains seven modes. This is accomplished by connecting the output of weighting unit 64 to an averaging circuit 72 and the output of weighting unit 68 to an averaging unit 74. Averaging units 72 and 74 are connected to analog memory units 76 and 78 respectively. The combination of an averaging unit and a memory unit operates under the control of the logic unit 18 and tape input 20 to average first the four "warm-up" cycle data with a multiplying coefficient of 0.65. The contents of the averaging units may be transferred to memory at the end of four and at the end of seven cycles. It will be noted that the contents of holding units 66 and 70 are dumped and replaced at the end of every measured mode.

The outputs of units 66, 70, 76 and 78 may be connected in combination to a suitable output transducer such as a strip chart recorder or an automatic typewriter for the production of a readable representation of the output signals therefrom.

Figure 3:
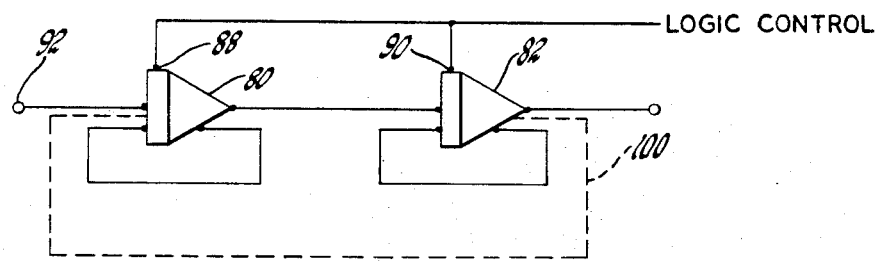
FIGURE 3 is a schematic representation of a portion of the circuit of FIGURE 1.

FIGURE 3 shows in schematic detail the implementation of the holding units 66 and 70 as well as the combinations 72, 76 and 74, 78. The apparatus which may be termed an "analog track-hold" device comprises two operational amplifiers 80 and 82 and secondary logic inputs 88 and 90 respectively which are connected to unit 18 of FIGURE 1. Under logic control, the amplifier 80 tracks (integrates) the voltages applied to input 92. Upon command, the accumulated value is transferred to amplifier 82 which until reset provides the same integrating function. In combination, amplifier 82 holds the integrated output from amplifier 80 thus acting as a storage location while amplifier 80 performs the next required operation. An overall feedback path 100, shown in broken lines, from the output of amplifier 82 to the input of amplifier 80 may be employed to control the overall gain and hence a multiplication coefficient such as described above.

It may be appreciated that the combination of FIGURE 3 involves both analog tracking and storing techniques and digital logic control and thus constitutes a hybrid system of particular advantage in the present invention.

In the system described above, particularly with reference to FIGURE 1, a certain time lag exists between the occurrence of the voice instruction on tape path 16 and the exhaust reaction as communicated to the analyzers 22 through 25 through the exhaust gas plumbing indicated at 21. Accordingly, it is necessary to synchronize the occurrence of the voice instructions with the later logic proesses which are controlled by the signals transmitted over path 20. The time lag is acounted for by the selection of a predetermined delay between the voice instructions and the logic signals in order to give the exhaust gas plumbing system and analyzers time to react. It is possible to largely eliminate this synchronous type of operation by employing means to detect a change in the quantity of the various exhaust constituents which change is of such a magnitude as to be associated with a mode change such as those shown in FIGURE 2. This may be termed asynchronous operation and a system for carrying out this operation is shown in FIGURE 4.

Figure 4:
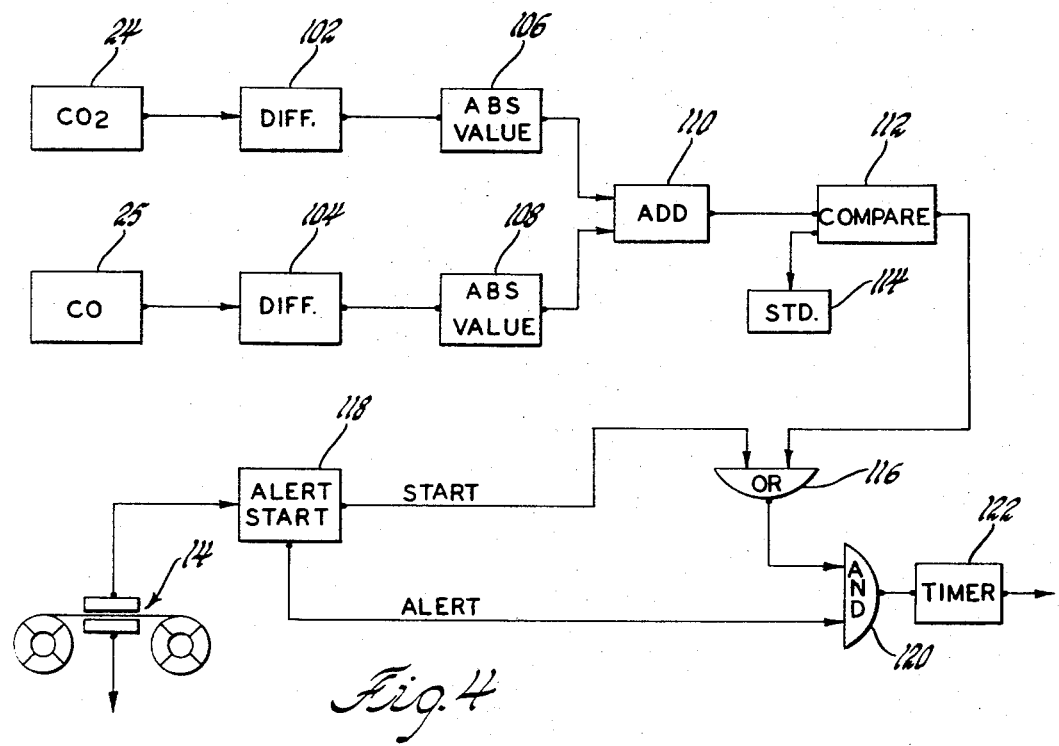
FIGURE 4 is a block diagram of an alternative embodiment of the invention.

Referring specifically to FIGURE 4 the analyzers 24 and 25 are connected such that the output voltages therefrom are received by a pair of differentiating circuits 102 and 104, respectively. The differentiating circuits are responsive to the rate of change of the input voltage to produce an output signal of a magnitude which corresponds to the rate of change and of a polarity indicating the sense of the rate of change. Thus, during an acceleration or deceleration mode the rate of change of the CO and $CO_2$ constituents delivered to the respective analyzers will produce voltage signals which are indicative of these changes. Since it is unnecessary to distinguish between positive and negative, that is, acceleration or deceleration modes for purposes of initiating the detection stage, it is unnecessary to work with the actual polarities of the outputs from differentiators 102 and 104. Therefore, the outputs of the differentiating circuits 102 and 104 are delivered to units 106 and 108 respectively which serve to produce output voltages corresponding to the absolute value of the input voltages thereto. The absolute value of the signals therefrom are added in an adder 110 and delivered to a comparator circuit 112 for comparison to a standard voltage which is indicated at 114. If the sum of the rate of change signals from adder 110 is above a predetermined threshold established by selection of the magnitude of the voltage at 114, a signal from comparator 112 is delivered to one input of an OR circuit 116. The other input to the OR circuit 116 comprises a "start" signal which is received from an alert-start unit 118 under control of the signals from the tape deck 14. The "alert" signal is delivered to one input of an AND gate 120. The other input of the AND gate is received from the output of OR gate 116. Whenever both inputs of AND gate 120 are properly energized, the output therefrom is delivered to a timer 122 to initiate the production of an output signal of fixed duration. This output signal is chosen to be long enough to define an adequate sampling period for operation of the logic circuitry shown in FIGURE 1.

From FIGURE 2 it can be seen that at least two of the modes are steady state and therefore will produce no rate of change signal from the differentiators 102 and 104. To initiate sampling during these steady state modes a signal prerecorded on the tape takes the place of the signal which would ordinarily be received from comparator 112 during the non-steady state modes. This, of course, accounts for the presence of the OR gate 116 in the circuit of FIGURE 4.

It is to be understood that the foregoing descriptions are intended to be illustrative only and are not to be construed as limiting the invention to the specific embodiments described. For a definition of the invention reference should be had to the appended claims.

We claim:

1. A method for analyzing the exhaust of an automotive vehicle engine comprising the steps of operating the engine over a cycle including a succession of modes of varying character, sensing selected exhaust constituents during each mode and producing first electrical signals representing the quantity of each constituent sensed, generating second electrical signals representing coefficients corresponding to the character of respective modes, electrically multiplying the first and second electrical signals in a sequence corresponding to the occurrence of the modes, and storing the products of the electrical multiplication.

2. A method for analyzing the exhaust of an automotive vehicle engine comprising the steps of operating the engine over a cycle including a succession of modes of varying character, sensing selected exhaust constituents during each mode and producing first electrical signals representing the quantity of each constituent sensed, generating second electrical signals representing coefficients corresponding to the character of respective modes, electrically multiplying the first and second electrical signals in a sequence corresponding to the occurrence of the modes, storing the products of the electrical multiplication, and averaging the products over at least one said cycle.

3. A method for analyzing the exhaust of an automotive vehicle engine comprising the steps of operating the engine over a cycle including a succession of modes of varying character, sensing selected exhaust constituents during each mode and producing first electrical signals representing the quantity of each constituent sensed, generating second electrical signals representing coefficients corresponding to the character of respective modes, electrically multiplying the first and second electrical signals in a sequence corresponding to the occurrence of the modes, storing the products of the electrical multiplication in a first storage unit, transferring said products to a second unit at the completion of each mode from which second unit said products may be individually recorded, and averaging the products over at least one said cycle.

4. A method for analyzing the exhaust of an automotive vehicle engine comprising the steps of operating the engine over a cycle including a succession of modes of varying character, sensing selected exhaust constituents during each mode and producing first electrical signals representing the quantity of each constituent sensed, generating second electrical signals representing coefficients corresponding to the character of respective modes, electrically multiplying the first and second electrical signals in a sequence corresponding to the occurrence of the modes, storing the products of the electrical multiplication in a first storage unit, transferring said products to a second unit at the completion of each mode from which second unit said products may be individually recorded, averaging the products over at least one said cycle, sensing the rate of change in said first electrical signals and initiating the generating of said second electrical signals at a predetermined rate of change.

References Cited

UNITED STATES PATENTS

| | | | |
|---|---|---|---|
| 1,729,732 | 10/1929 | Wasson | 73—116 |
| 2,130,900 | 9/1938 | Presbrey | 73—23 X |
| 2,999,383 | 9/1961 | Bryan | 73—23 X |
| 3,108,929 | 10/1963 | Tolin et al. | 73—23 X |
| 3,284,165 | 11/1966 | Baumann et al. | 73—23 X |
| 3,309,684 | 3/1967 | Kahn et al. | 73—23 X |

RICHARD C. QUEISSER, *Primary Examiner.*

JERRY W. MYRACLE, *Assistant Examiner.*